United States Patent [19]
McEwan

[11] 3,841,174
[45] Oct. 15, 1974

[54] APPARATUS FOR SHARPENING DIFFERENT TYPES OF CIRCULAR SAWS, TOOLS AND OTHER CUTTERS HAVING A WIDE RANGE OF DIAMETERS

[76] Inventor: James McEwan, 138 Stockton Ave., San Jose, Calif. 95126

[22] Filed: Apr. 16, 1973

[21] Appl. No.: 351,306

[52] U.S. Cl. .................................................. 76/41
[51] Int. Cl. ............................................ B23d 63/12
[58] Field of Search ................ 76/37, 40, 41, 42, 43

[56] References Cited
UNITED STATES PATENTS

| | | | |
|---|---|---|---|
| 2,675,717 | 4/1954 | Standal | 76/41 |
| 2,798,384 | 7/1957 | Kester | 76/40 |
| 2,811,874 | 11/1957 | Rethoret | 76/40 |
| 3,139,774 | 7/1964 | Sipinen et al. | 76/40 |
| 3,279,282 | 10/1966 | Gill | 76/40 |
| 3,481,224 | 12/1969 | Aijala | 76/40 |
| 3,691,874 | 9/1972 | Miller | 76/41 |

*Primary Examiner*—Harrison L. Hinson
*Attorney, Agent, or Firm*—Allen and Chromy

[57] ABSTRACT

A saw grinder for facing, topping and side dressing carbide tipped saw blades as well as carbon steel and high speed steel saw blades of various diameters from 4 inches to 54 inches. This grinder may also be used to sharpen other tools and cutters. This saw grinder is provided with a heavy base to which a steel column is attached. The saw to be sharpened is supported by a saw holder on a rail which is mounted on the steel column and which is elevated on this column by a hand wheel that operates a worm and rack saw elevator so that the saw may be raised or lowered with respect to the motor driven grinding wheel. The top of the column is provided with a plate on which the grinder head is supported by a tilting mechanism which is adjusted by a tilt gear and a hand wheel. The head is also provided with a horizontal ram that is adjusted by another hand wheel and the grinder is supported on the forward end of this ram by a quill which is adjusted by a gear and rack device to move the grinding wheel up and down with respect to the saw. The grinding wheel of this apparatus may be oriented with respect to the saw through various adjustments so that the saw teeth may be ground at any angle and to various depths. This is accomplished by providing various adjustments of the grinding wheel with respect to the saw including front-back movement and tilt, turning the plane of the grinder, moving the grinder up and down, and a micro-feed positioning slide with locks and stops as needed.

15 Claims, 14 Drawing Figures

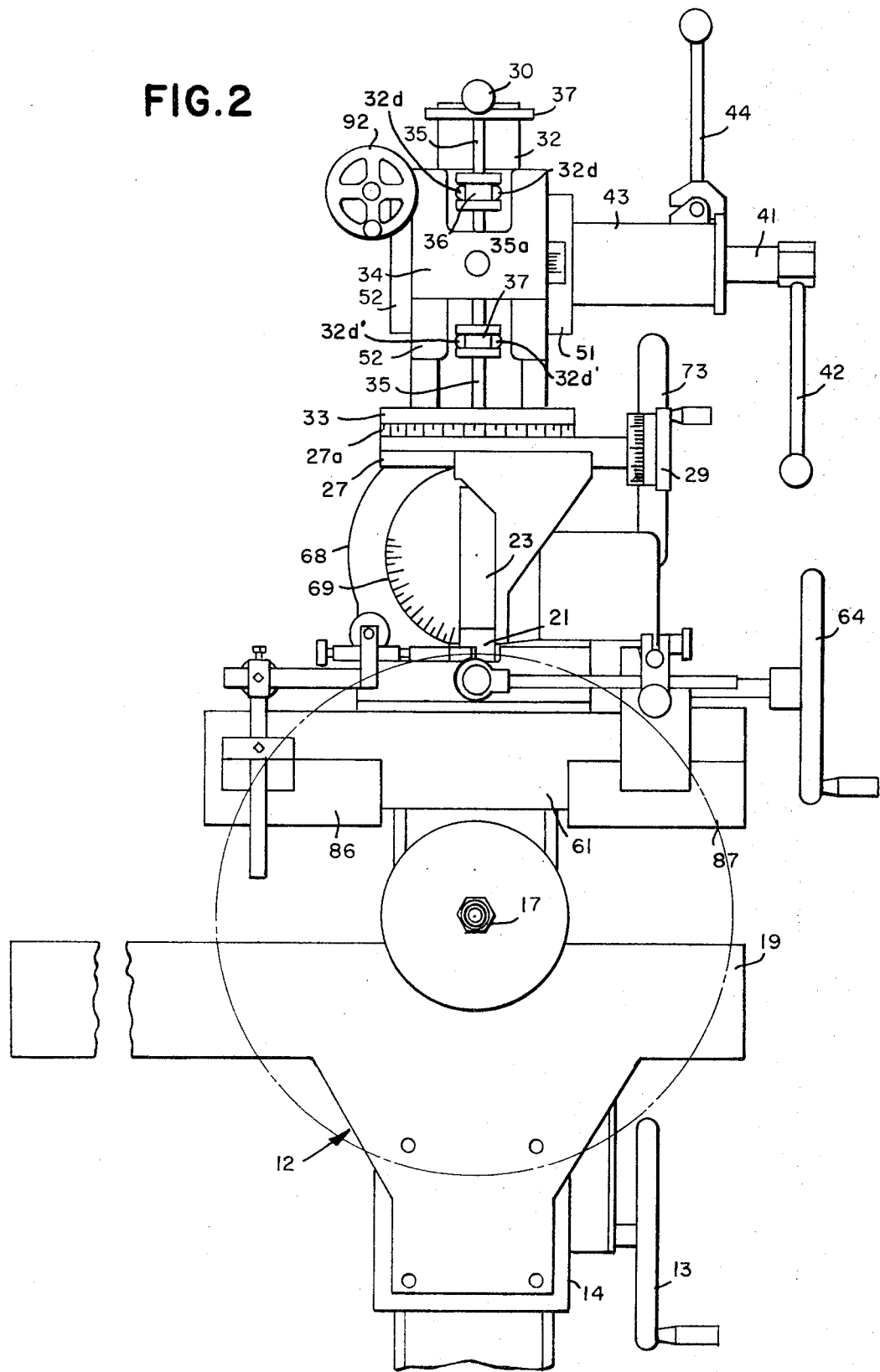

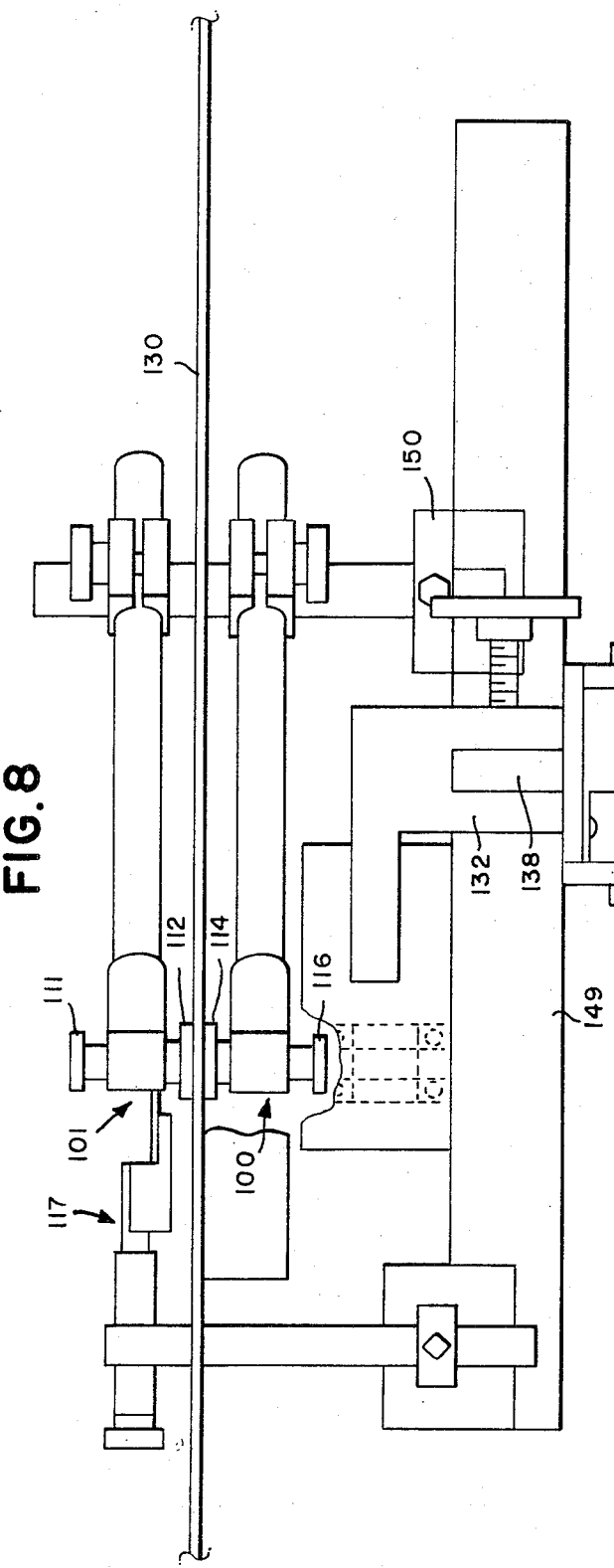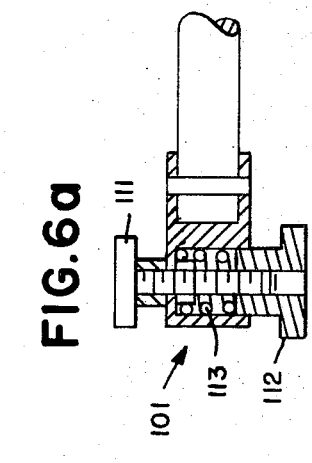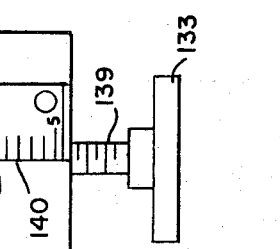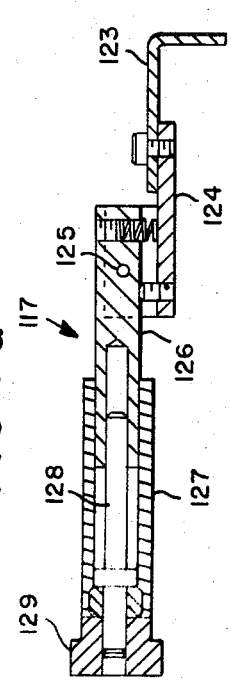

APPARATUS FOR SHARPENING DIFFERENT TYPES OF CIRCULAR SAWS, TOOLS AND OTHER CUTTERS HAVING A WIDE RANGE OF DIAMETERS

DESCRIPTION OF THE INVENTION

This invention relates to a saw grinder for sharpening carbon steel, high speed steel and carbide tipped saws having diameters ranging from four inches to fifty four inches.

An object of this invention is to provide an improved saw grinder on which facing, topping and side dressing of saw blades may be performed.

Another object of this invention is to provide an improved saw grinder on which all three cutting edges of carbide tipped saws may be sharpened and on which all regular sharpening operations of carbon steel and high speed steel saw blades may also be performed.

Another object of this invention is to provide a saw grinder capable of sharpening saws having a wide range of diameters in which all grinding is done with the top of the saw at convenient eye level and with all controls and indicators of the grinder within easy reach of the operator Still another object of this invention is to provide an improved saw grinder with a grinding head that can be positioned to grind any desired angle on the teeth of various circular saws now in use.

Another object of this invention is to provide a grinder that may be used to sharpen tools and cutters other than saws.

Other and further objects of this invention will be apparent to those skilled in the art to which it relates from the following specification, claims and drawing.

In accordance with this invention there is provided a heavy duty motor driven saw grinder that is capable of performing all grinding operations on circular saws as well as other tools and cutters having a wide range of diameters so that small saws as well as the largest diameter saws now in use may be ground and sharpened thereon. This apparatus is provided with a base to which a column is attached for supporting the grinding head on the top thereof. A saw or tool holder is mounted on the column and an elevating mechanism is provided so that the saw holder may be elevated or lowered as the case may be depending upon the size of the saw being sharpened. Thus the grinding is done at the top of the saw at convenient eye level so as to give a clear view of each tooth being ground. The grinding head can be raised, lowered, swiveled, and locked through an angle of 180° and all controls and indicators for these adjustments are within easy reach and view of the operator. Large protractors and locks are provided for all angular settings so that topping, facing and side dressing of the saw blade may be readily accomplished with high accuracy.

Further details and features of this invention will be set forth in the following specification, claims and drawing, in which briefly:

FIG. 2 is a front view of the grinding head and the saw support with the saw shown in broken outline;

FIG. 6a is a detail sectional view of one of the saw engaging members;

FIG. 7a is a sectional view of the pawl assembly;

FIG. 8 is a front view of the saw guiding and supporting mechanism used for grinding a saw held in horizontal position;

Figure 1:
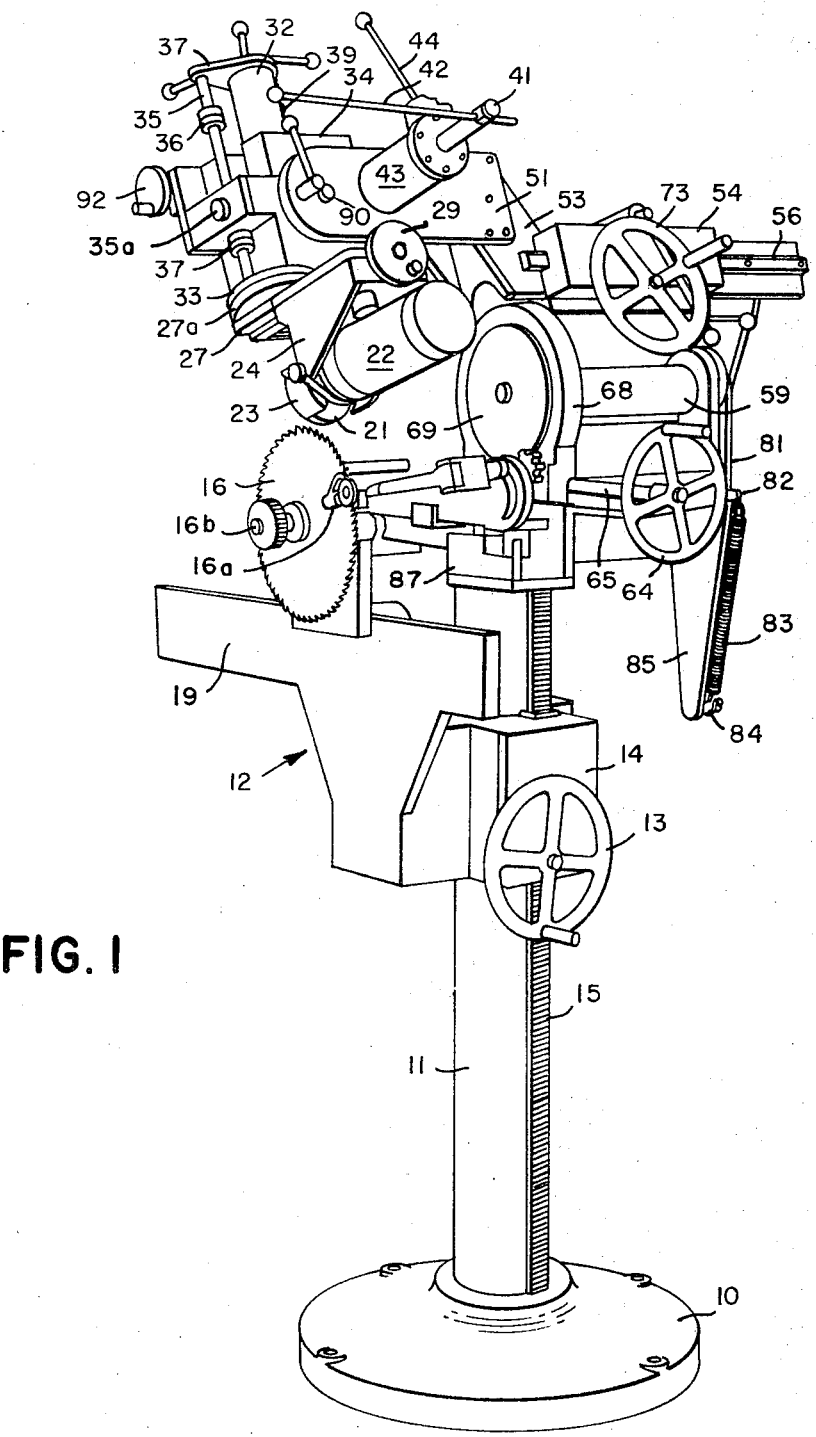
FIG. 1 is a perspective view of an embodiment of this invention.

Referring to FIGS. 1 and 2 of the drawing in detail, reference numeral 10 designates the base which is preferably of cast iron and to which the tubular column 11 is fixedly attached. The saw supporting carriage 12 is slidable up and down on the column 11 and this up and down movement is controlled by the handwheel 13 that operates a conventional gear mechanism positioned in the housing 14 of the saw elevator. This gear mechanism engages the rack 15 which extends along a side of the column and is attached thereto.

Figure 4:
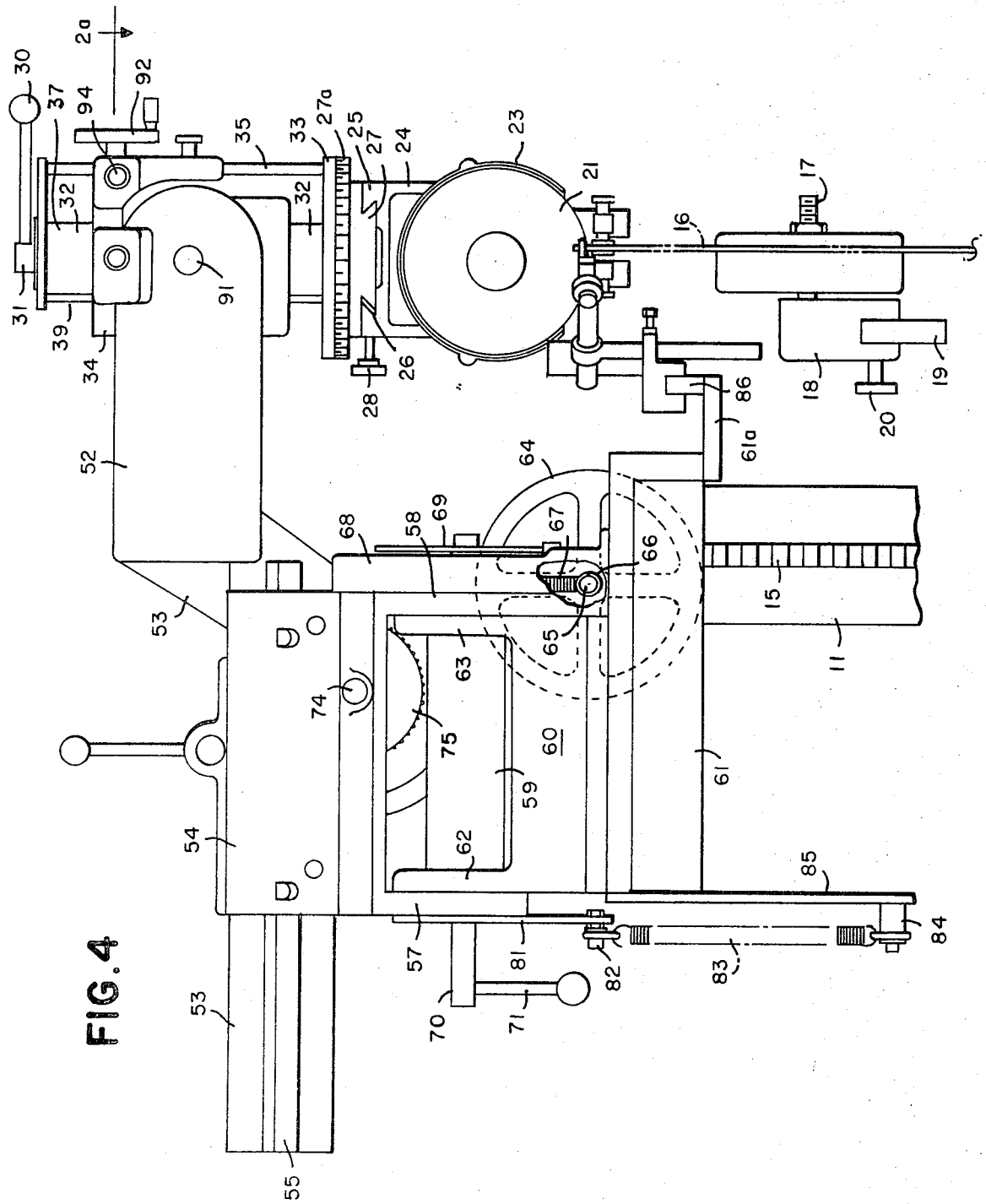
FIG. 4 is a side view of the grinding head and saw support.

The circular saw 16 to be sharpened is attached to the rotatable support 16a that is of the type shown in U.S. Pat. Nos. 2,580,812 and 2,798,384. Larger saw blades may be mounted on a reel 17 as shown in FIGS. 2 and 4, supported by the member 18. The member 18 is clamped to the rail 19 by the thumb screw 20 so that the saw support may be moved on the rail 19 simply by loosening the thumbscrew 20. The rail 19 is attached to the saw elevator housing which may be raised or lowered by operating the handwheel 13 so that the saw 16 may be raised or lowered with respect to the grinder wheel 21 that is mounted on the shaft of the reversible motor 22. The grinding wheel 21 is provided with a metal guard 23 and this guard and motor are attached to the support 24.

The support 24 is provided with inclined portions 25 and 26 which engage opposing sloping sides of the vee ways of the swivel head 27 and the support 24 is slidable thereon. The inwardly inclined member 26 is adjustable by one or more thumbscrews 28 to tighten the motor support on the vee ways of the swivel head 27 and prevent free play thereon. A graduated circular scale 27a is attached to the top of the swivel head 27 to indicate the swivel angle of the grinder.

Figure 3:
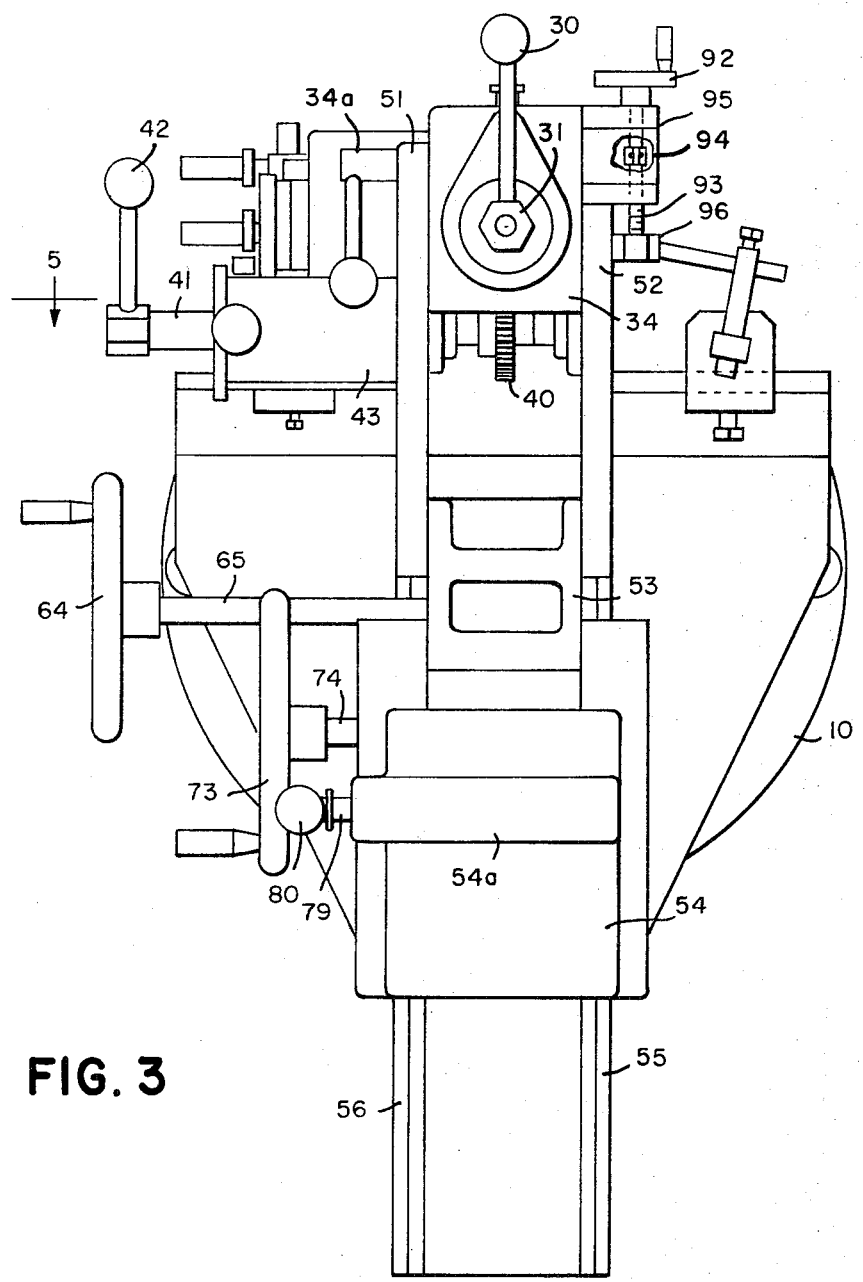
FIG. 3 is a top view of this apparatus.

The motor and grinding wheel support 24 may be moved back and forth on the vee ways by rotating the handwheel 29 that operates a threaded member (not shown) extending through the upper part of the support 24 and into the head 27. When this threaded rod is rotated by the handwheel 29 the motor and grinding wheel unit is shifted laterally and the position of the grinding wheel 21 is adjusted with respect to the saw 16. The swivel head 27 and the grinder carried thereby may be rotated as a unit by turning the handle 30 that is attached to the top portion of the rod 31 as shown in FIG. 3. Rod 31 extends through the vertical slide post 32 which is hollow and the bottom end portion of the rod is attached to the swivel head 27.

Figure 2A:
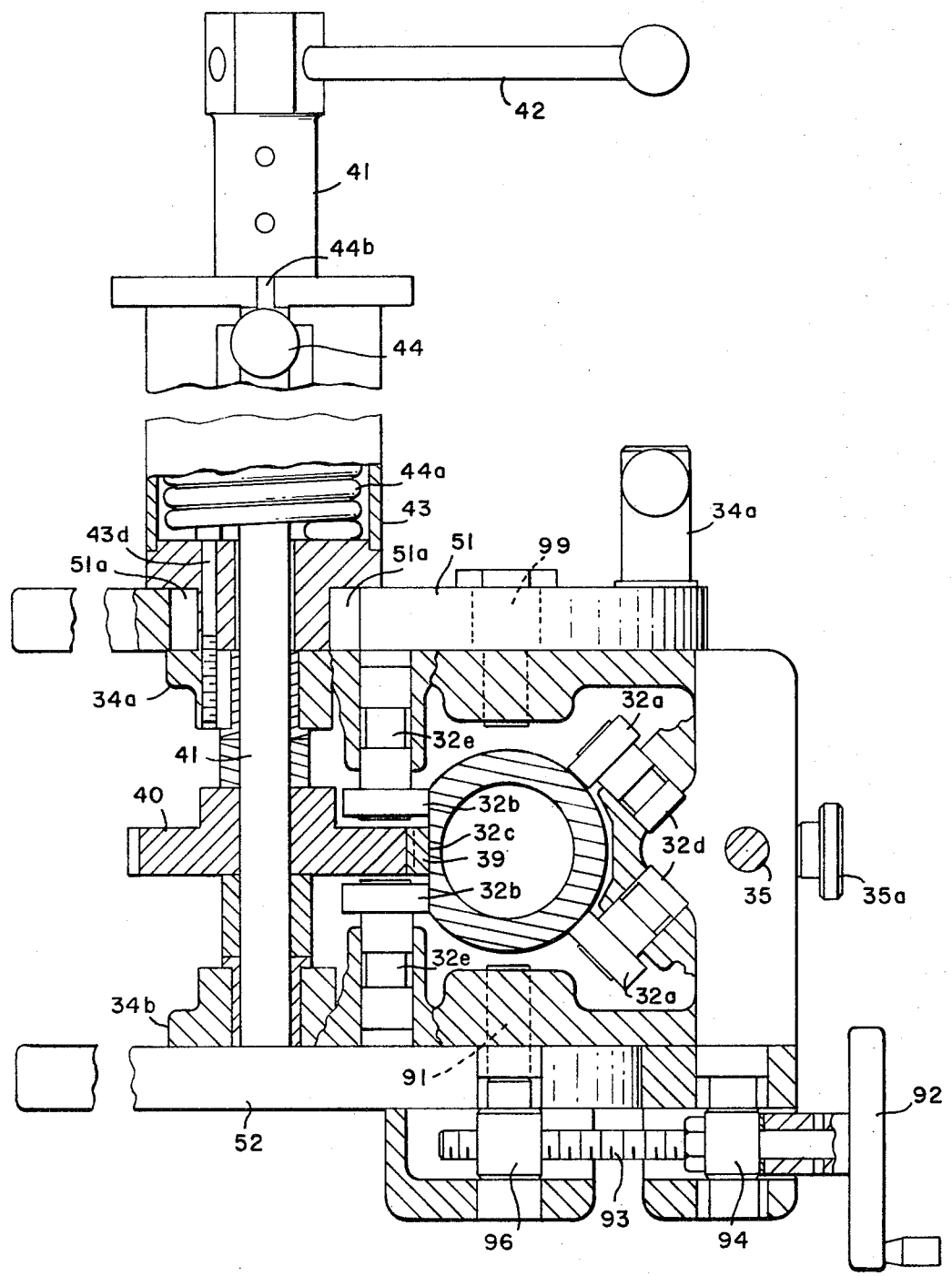
FIG. 2a is a sectional view taken along the line 2a—2a of FIG. 2.

The member 27 is positioned with the top surface thereof against the bottom surface of the plate 33 that is attached to the bottom of the post 32. The post 32 is slidable up and down in the block 34 and two sets of rollers mounted on ball bearings as shown in FIG. 2a, are provided to guide the post. Each of these sets of rollers includes two rollers 32a which engage the flattened forward parts of the post 32 and two rollers 32b which engage the flat portion 32c at the rear of the post. Rollers 32a are supported by ball bearing assemblies on the inner ends of the eccentric pins 32d which are rotatably fitted into the block 34. Rollers 32b are supported by eccentric pins 32e and these pins are also rotatably fitted into the block 34. The set of rollers 32a and 32b shown in FIG. 2a are positioned in the upper part of the block 34 and the roller supporting pins 32d are inserted into this block from the front thereof as shown in FIG. 2. The pins 32 e which support the rollers 32b are inserted into the sides of the block 34 before this block is mounted between the plates 51 and 52. A similar set of rollers is provided in the lower part of the block 34 and the pins 32d' shown in FIG. 2, which support the forward lower rollers, are inserted into the block 34 from the front thereof. A set of pins similar to pins 32e is provided in the lower part of the block 34 to support the lower rollers corresponding to the rollers 32b shown in FIG. 2a. All rollers are mounted on eccentric pins for taking up all play.

An adjustable motion limiting device which includes the threaded rod 35 and the thumbwheels 36 and 37 is provided for limiting the up and down movement of post 32. A locking device 35a that is threaded into the block 34 engages the rod 35 when adjusted by the knob on the front of the block to hold the post 32 in a predetermined position. The threaded rod 35 is attached to the plate 37 which is positioned at the top of the post 32 and the bottom of this rod is attached to the plate 33. A rack 39 is attached to the flat back side 32c of the post 32 and the pinion 40 engages this rack as shown in FIG. 2a so that when the pinion 40 is rotated by the shaft 41 to which it is fixedly attached, the post 32 is raised or lowered and the grinding wheel 21 and motor 22 which are carried by the post 32 are also raised and lowered. A handle 42 is attached to the rod 41 so that the operator of this device may readily raise or lower the grinding head.

Figure 5:
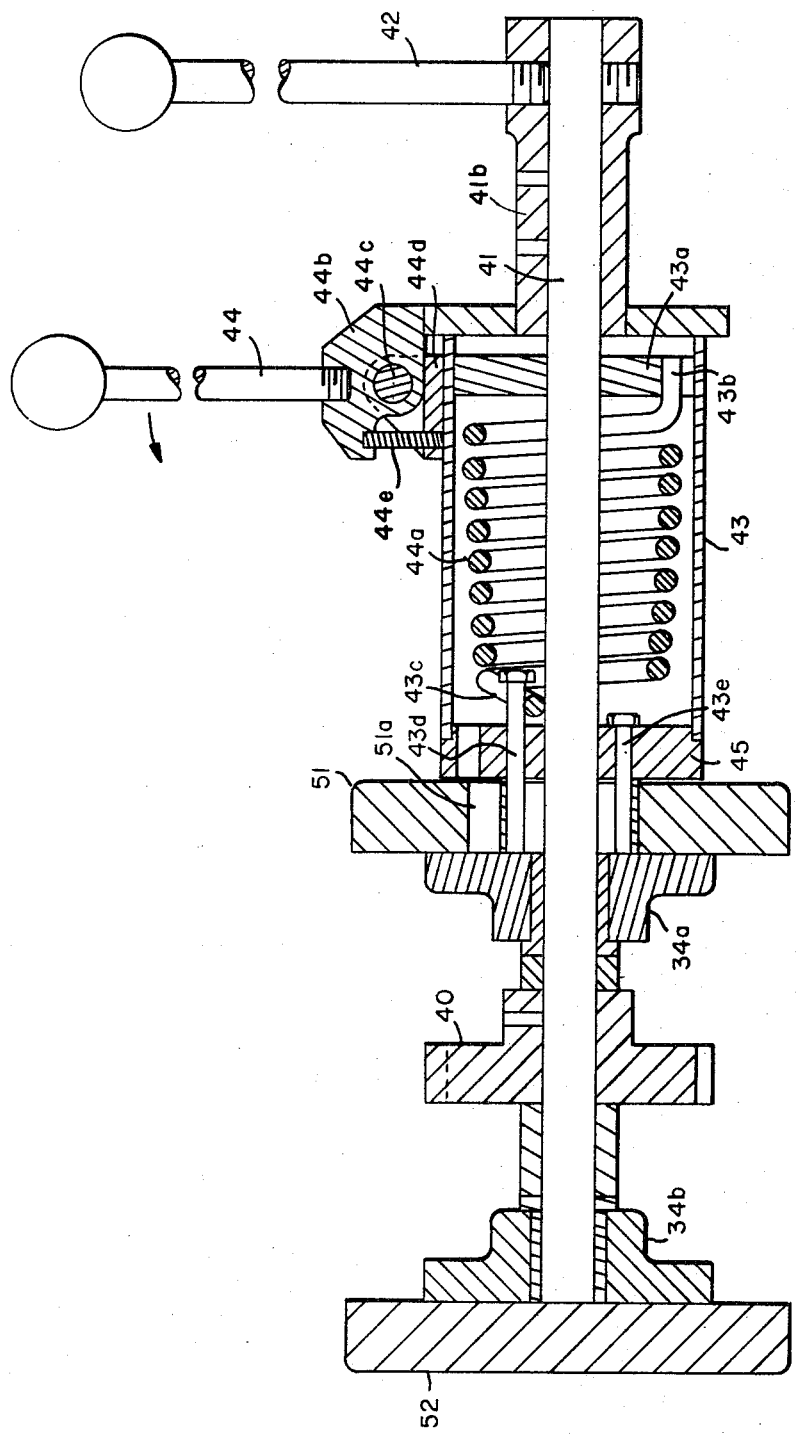
FIG. 5 is a sectional view taken along the line 5-5 of FIG. 3.

Since the weight of the mechanism to be raised or lowered by operating the handle 42 is quite substantial and includes the grinding head and the post 32, a spring loading mechanism which is housed in the housing 43 as shown in FIG. 5, is provided to the shaft 41. A handle 44 is attached to the spring loading mechanism for adjusting the tension of the spring 44a.

The handle 44 is attached to the locking member 44b which is pivotally attached by the pivot pin 44c to member 44d. The circular member 41a which is supported on the rod 41 by the sleeve 41b, is provided with recesses around the periphery thereof. The locking member 44b is adapted to engage the member 41a in different ones of these recesses depending upon the tension that is to be applied to the coil spring 44a. The coil spring 44a is tapered as shown in FIG. 5 to keep it from rubbing on the inside of the housing 43 during raising or lowering of the post 32 by the handle 42.

The outer end 43b of the coil spring 44a is attached to the circular member 43a that is attached to the inside of the housing 43 near the outer end thereof. Member 44d is also attached to the housing 43 and all of these parts including the housing 43, the member 43a and the member 44d are adapted to be rotated by the handle 44. Thus, when it is desired to adjust the tension of the spring 44a the handle 44 is tilted to the left as indicated by the arrow shown in FIG. 5 and the lock 44b is disengaged from a recess of a member 41a. At the same time, the spring 44e which urges the lock 44 into engagement with recesses of the member 41a is compressed. When the lock 44b is disengaged from member 41a the housing 43 and member 43a may be rotated by rotating the handle 44 to adjust the tension on the spring 44a.

The outer end of the coil spring 44a is attached to the member 43a and the inner end 43c is attached to the bolt 43d which passes through the circular member 45 and is threaded into the part 34a of the housing 34. Thus, rotation of the handle 42 will either wind or unwind the spring 44a depending on which direction the handle is rotated.

Another bolt 43e is positioned in a hole formed in the member 45 and is also threaded into the part 34a. The circular member 45 is provided with an annular recess for receiving the inner end of the housing 43 and this recess functions as a bearing for the housing. The rod 41 passes through the member 43a and functions as a support for this member and for the outer end of the housing 43. The rod 41 also passes through the member 45 and the pinion 40 which is positioned between the members 34a and 34b is fixedly attached to this rod. Suitable bearings are provided in the parts 34a and 34b of the housing 34 for the rod 41.

The block 34 is supported by suitable pivots between the plates 51 and 52 that are attached to the forward end of ram 53 as shown in FIGS. 1 and 3. The ram 53 is provided with slides 55 and 56 attached to the sides thereof and ways are provided in the ram support 54 for slidably supporting the slides 55 and 56 and the ram 53. The ram support 54 is provided with brackets 57 and 58, shown in FIG. 4, that are mounted on the shaft 59. The supporting member 60 which is attached to the top plate 61 of the column 11 is provided with bearing members 62 and 63 that rotatably support the shaft 59.

The sidewise tilt of the horizontal ram 53 and its housing 54 is adjusted by the handwheel 64 which is fixedly attached to the outer end of the shaft 65. The inner end of shaft 65 is provided with a worm 66 that actuates a gear 67 which is attached to member 58 and is enclosed in the housing 68. A protractor 69 is attached to the gear 67 to indicate the tilt of the head supporting the motor and grinder. A locking rod 70 extends through the shaft 59 and the outer end thereof is provided with an operating handle 71. The inner end of rod 70 is attached to the protractor 69. When rod 70 is turned slightly it draws castings 57, 62 and 58, 63 together sufficiently to lock them at the desired tilt provided to the head by operating the handwheel 64. Another handwheel 73 shown in FIG. 3 is attached to the outer end of the shaft 74 which extends into the ram support 54 and is provided with a gear 75 shown in FIG. 4. Gear 75 engages a rack which is attached to the bottom surface of the ram 56 (not shown) so that the ram and the entire head carried thereby may be moved forward or backward by turning handwheel 73. Thus, the grinder may be traversed across the saw. A ram lock which includes a cam (not shown) positioned in the housing portion 54a, shown in FIG. 3, that is attached to the top of the housing 54 is actuated by the rod 79 and handle 80 so that the ram may be locked thereby after it is adjusted to a predetermined position.

An arm 81 shown in FIG. 1 and 4, is attached to the casting 57 so that it is rotatably therewith and the lower end of this arm is provided with a stud 82 to which the top end of the coil spring 83 is attached. The bottom end of the spring 83 is attached to the stub 84 that is provided to the lower end of the arm 85 which is attached to the plate 61. The spring 83 functions as a counter balance for the head which includes the ram 53 and the grinder carried thereby to permit easier return of the tilting head by the handwheel 64. The plate 61 is provided with a forward extension 61a and the rails 86 and 87 are attached to the front end of this extension to provide supporting means for the saw pawls and clamps.

The housing 34 of the post 32 is pivotally supported on the members 51 and 52 by the pivots 90 and 91, respectively, shown in FIGS. 1 and 4. The post housing 34 may be tilted through a limited angle by rotating the handwheel 92 shown in FIG. 2a. The handwheel 92 is fixedly attached to the outer end of the threaded rod 93. The threaded rod 93 passes through the swivel 94 that is attached to the post housing 34 by the bracket member 95. The rod 93 is threaded into the nut 96 which is attached to the plate 52. Thus, by turning the handwheel 92, the post 32 and its housing 34 may be tilted through a limited angle determined by the spacing 51a provided in the member 51 around shaft 41 as shown in FIG. 5. The spacing 51a is necessary since the shaft 41 is supported by members 34a and 34b which are part of the post housing 34 and this shaft is offset from th pivoting studs 90 and 91 of the post housing. A clamp 34a is provided to lock post housing 34 in desired angular position. Stops are provided on opposite sides of the swivel 94 so that the rod 93 which is rotatable in the swivel may not shift with respect thereto along its axis.

Figure 6:
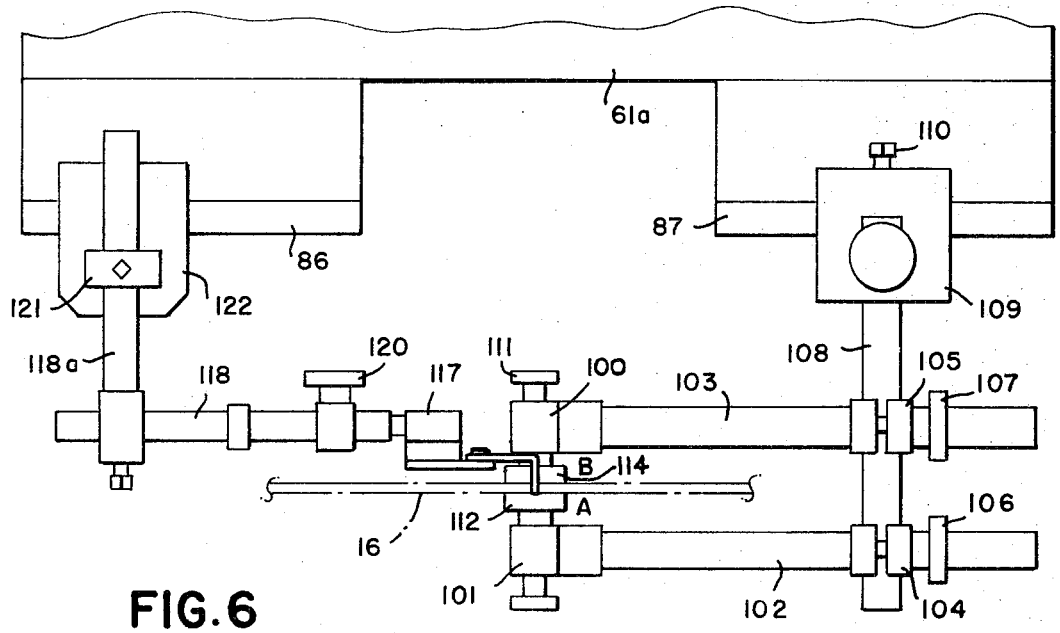
FIG. 6 is a top view of the saw guide used for grinding a saw held in vertical position.
Figure 7:
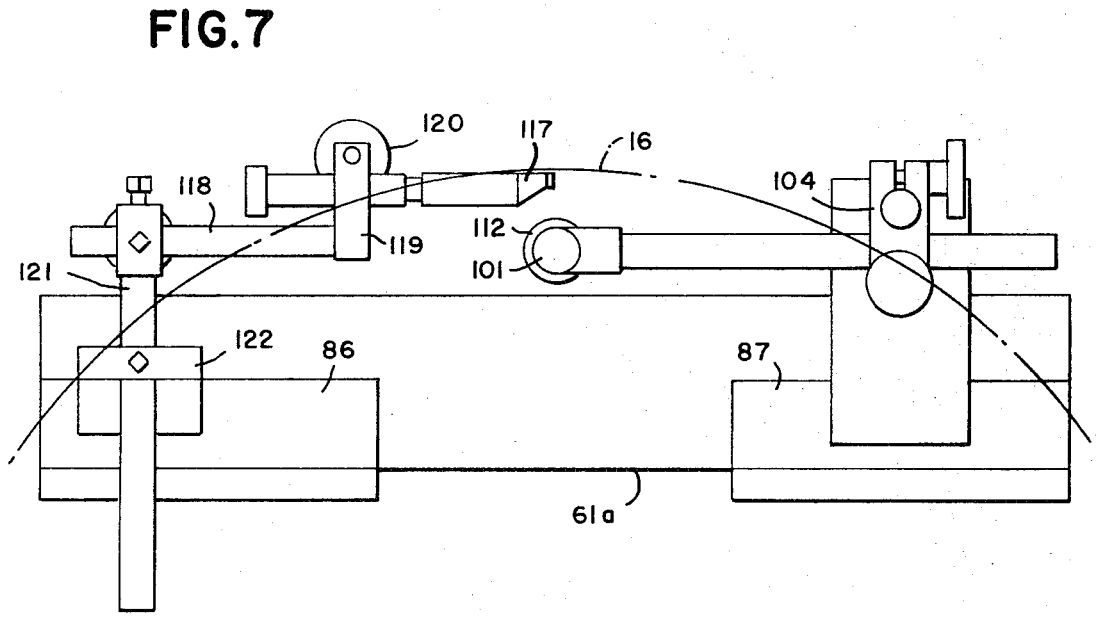
FIG. 7 is a side view of the saw guide shown in FIG. 6.
Figure 6B:
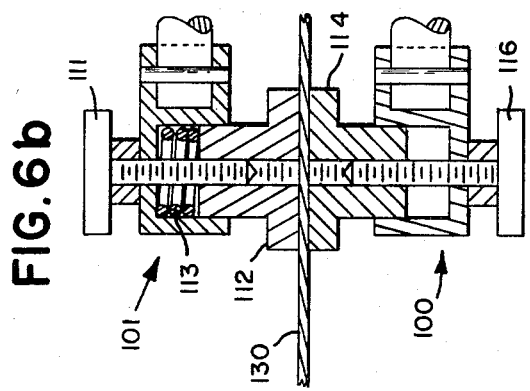
FIG. 6b is a sectional view showing a saw positioned between the steady clamps.

When a large vertically disposed saw is to be ground the saw holder shown in FIGS. 6 and 7 is employed. The saw 16 which is supported on the rail 19 by the device 17 is positioned between the clamping members 100 and 101 which are supported by the bars 102 and 103, respectively. A rotatable saw support of the type shown in U.S. Pat. Nos. 2,580,812; 2,775,146 and 2,798,384 may be employed. The bars 102 and 103 are attached to the members 104 and 105, respectively, which are provided with thumb nuts 106 and 107, respectively, for clamping them to the mounting post 108. The post 108 is attached to the block 109 which is clamped to the rail 87 by the bolt 110.

In sharpening a large saw that is held in vertical position as shown in FIGS. 6 and 7 an adjustable spring loaded clamping member 101 such as shown in FIG. 6a is provided on the front of the saw. Clamping member 101 is provided with an adjusting screw 111 that is threaded into pad 112 which is urged by coil spring 113 against the saw 16. An adjustable clamping member 100 is provided on the back of the vertical saw. Clamping member 100 is provided with an adjusting screw 111 that is threaded into pad 114 so that this pad may be brought into contact with the back side of the saw. Clamping members 100 and 101 prevent the saw from chattering during the sharpening operation.

A spring loaded pawl 117 is provided to the saw holder for engaging a predetermined sawtooth to prevent rotation of the saw in the backward direction during the saw grinding operation. The pawl 117 is supported on the bar 118 by the member 119 which is provided with a thumb screw for clamping the body of the pawl. The bar 119 is clamped in the end of the bar 121 which is supported on the rail 86 by the clamping block 122. The pawl assembly is provided with a finger 123 that engages the selected sawtooth and this finger is attached to the block 124. The finger block 124 is pivotally supported by the pivot pin 125 which is provided to the rectangular slide bar 126 that is adapted to slide in the tubular body 127. An adjusting screw 128 is positioned in the tubular body 127 and this screw is threaded into the slide bar 126 when the knob 129 is attached to the screw is rotated.

Figure 9:
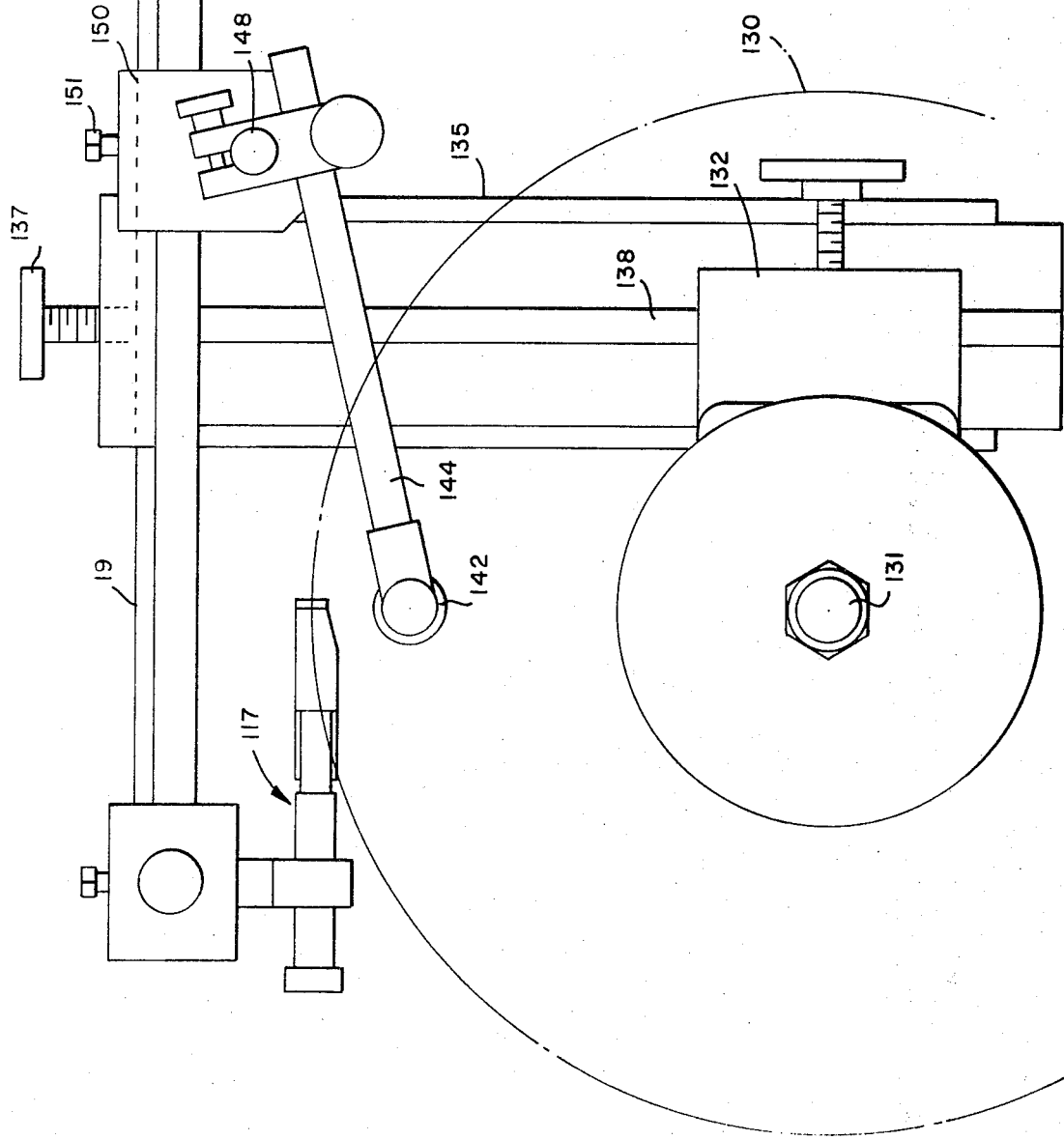
FIG. 9 is a top view of the saw guiding and supporting mechanism shown in FIG. 8.
Figure 10:
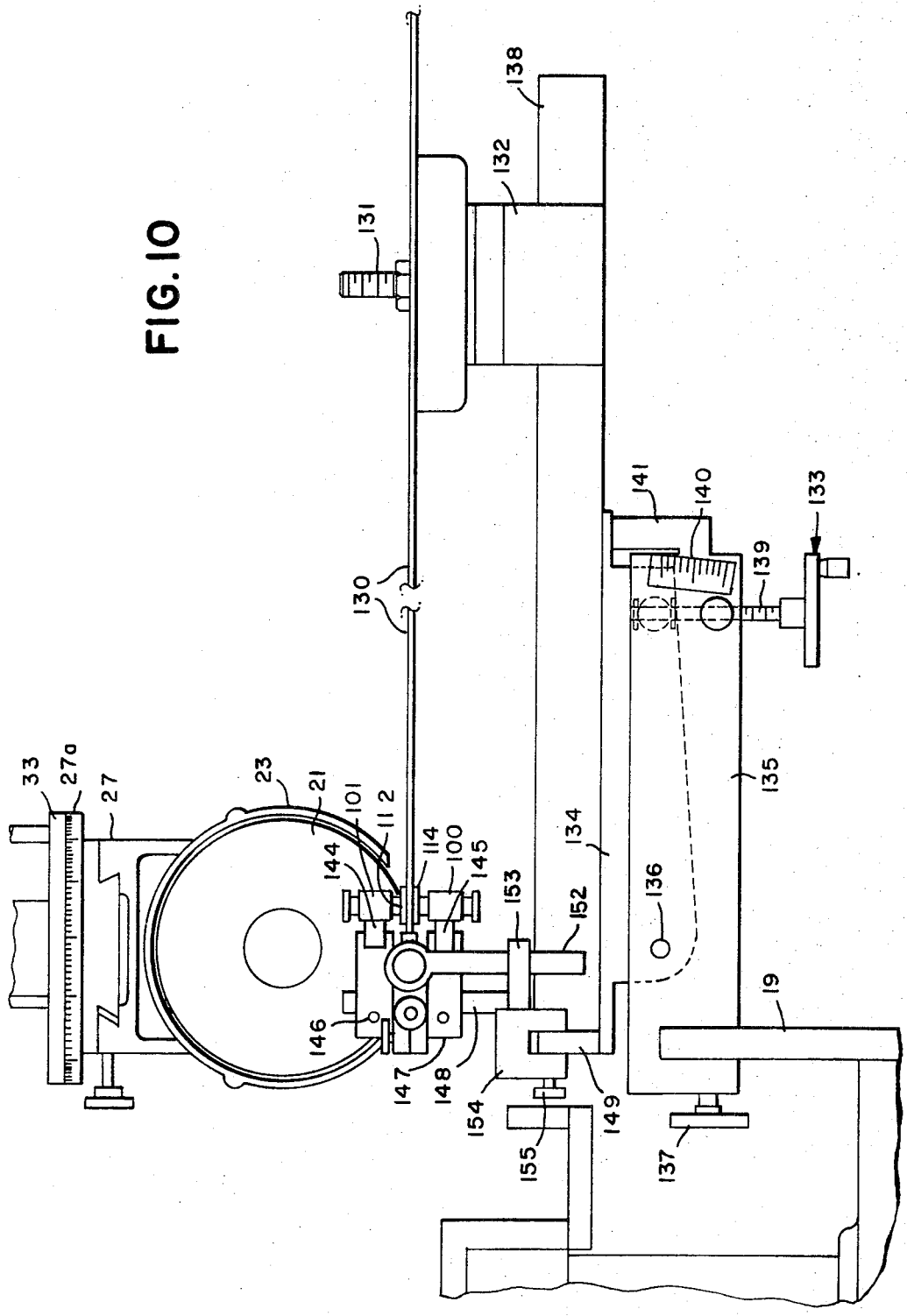
FIG. 10 is a side view of the mechanism shown in FIGS. 8 and 9 showing the position of the saw with respect to the grinding wheel.

When a horizontally disposed saw is to be ground the saw holder shown in FIGS. 8, 9 and 10 is employed. The saw 130 is supported by the saw holder 131 on the slidable support 132 which is clamped to the beam 138. The beam 138 is provided with a member 134 attached to the bottom thereof and this member is pivotally attached to the beam 135 by the pivot pin 136. The beam 135 is supported by the rail 19 to which it is clamped by the bolt 137 as shown in FIG. 10. Rail 19 is attached to the saw elevating mechanism shown in FIG. 1. The beam 138 which supports the saw is tilted on the pivot 136 by rotating the handwheel 133 which is attached to the threaded rod 139 so that the saw 130 supported by the beam 138 can be inclined up or down. The threaded rod 139 is supported in a threaded nut that is attached to the beam 135 and the upper end of this rod bears against the member 134 so that the beam 138 to which the member 134 is attached may be brought into an angular orientation so that the teeth of the saw 130 can be side dressed to any desired angle. A calibrated member 140 is attached to the beam 135 and a suitable indicator line is provided to the member 141 which is attached to the bottom of the beam 138, indicates when the beam 138 is set at the desired angle. Saw guides 101 and 100 are supported on the top and bottom, respectively, of the saw by arms 144 and 145, respectively. In this case the spring loaded clamping member 101 is used on the top of the horizontally supported saw with the pad 112 pressed against the saw by the spring 113. The adjustable clamping member 100 is used on the underside of the saw and the pad 114 is brought into contact with the saw by the screw 116. The post 148 is supported on the rail 149 by the clamping block 150 which is clamped to this rail by the bolt 151. Rail 149 is attached to the beam 138 so that the saw guides 142 and 143 which engage the saw 130 are movable together with the saw when the handwheel 133 is adjusted to adjust the angular orientation of the saw. A pawl assembly 117 which is of the type illustrated in FIG. 7a is supported by members 152 and 153 on the clamping block 154 which is clamped to the rail 149 by the bolt 155. This horizontal sawholding device can also be used for sharpening saws with long deep cutting slots extending toward the mounting flange of the saw or cutting slots extending from the center of the saw outward part way to the periphery thereof.

While I have shown and described a preferred form of the invention, it will be understood that the invention is capable of variation and modification from the form shown so that its scope should be limited only by the scope of the claims appended hereto.

What I claim is:

1. In apparatus for sharpening different types of circular saws, tools and other cutters having a wide range of diameters, the combination comprising a grinder unit including a grinding wheel and means driving said wheel, means positioning a saw with respect to said grinding wheel, means supporting said grinder unit including a substantially vertical post and said means moving said grinding wheel into said saw comprises a rack attached to said post and a gear engaging said rack and a spring loaded lever rotating said gear and moving said post up or down, said supporting means also comprising means tilting said unit with respect to said saw, means traversing said grinding wheel across said saw, and means adjusting said grinding wheel laterally with respect to the direction of traverse and means moving said grinding wheel into said saw.

2. In apparatus for sharpening different types of circular saws, tools and other cutters having a wide range of diameters, the combination as set forth in claim 1, further characterized in that said gear is attached to a shaft and said spring for said spring loaded lever is coiled around said shaft, and means for adjusting the tension of said spring so that said spring assumes some of the weight of said post and said grinder unit during the raising and lowering of said unit by said lever.

3. In apparatus for sharpening different types of circular saws, tools and other cutters having a wide range of diameters, the combination as set forth in claim 1, further characterized in that said means supporting said grinder unit includes a block in which said post is slidably supported by two sets of rollers and means pivotally supporting said block, and said means tilting said grinding unit comprising means rotating said block on its pivoting means.

4. In apparatus for sharpening different types of circular saws, tools and other cutters having a wide range of diameters, the combination as set forth in claim 3, further characterized in that said block is supported between a pair of members by said pivot means, said pair of members being attached to a ram for traversing said grinding wheel across said saw.

5. In apparatus for sharpening different types of circular saws, tools and other cutters having a wide range of diameters, the combination comprising a substantially vertical stand, means supporting a saw to be sharpened on said stand comprising a rail adjustably supported on said stand and a reel supporting said saw on said rail, a grinder unit including a grinding wheel and means driving said wheel, a substantially vertical post, means supporting said unit on the bottom of said post so that said grinding wheel is adjacent to said saw, said last mentioned means including means moving said unit laterally and rotatably with respect to the axis of said post to provide different angular adjustments of said grinding wheel with respect to said saw, and means moving said post and said unit carried thereby up and down with respect to said saw.

6. In apparatus for sharpening different types of circular saws, tools and other cutters having a wide range of diameters, the combination as set forth in claim 5, further characterized in that said stand is provided with a plate at the top thereof, a ram, means supporting said ram to said plate and means supporting said substantially vertical post on the front of said ram.

7. In apparatus for sharpening different types of circular saws, tools and other cutters having a wide range of diameters, the combination as set forth in claim 6, further characterized in that said means supporting said ram to said plate comprises means tilting said ram and said substantially vertical post sidewise.

8. In apparatus for sharpening different types of circular saws, tools and other cutters having a wide range of diameters, the combination as set forth in claim 7, further characterized in that said tilting means comprises a manually rotatable shaft and worm for rotating a gear attached to said ram supporting means.

9. In apparatus for sharpening different types of circular saws, tools and other cutters having a wide range of diameters, the combination as set forth in claim 6, further characterized in that said ram comprises a rack attached thereto and a manually rotatable pinion engaging said rack for moving said ram and said grinder unit back and forth.

10. In apparatus for sharpening different types of circular saws, tools and other cutters having a wide range of diameters, the combination comprising a substantially vertical stand, means supporting a saw to be sharpened on said stand, a grinder unit including a grinding wheel and means driving said wheel, a substantially vertical post, means supporting said post on said stand, said post supporting means comprising a block slidably receiving said post and a ram for moving said post back and forth, means attaching said unit to the bottom of said post so that said grinding wheel is adjacent to said saw, said last mentioned means including means moving said unit laterally and rotatably with respect to the axis of said post to provide different angular adjustments of said grinding wheel with respect to said saw, and means moving said post and said unit carried thereby up and down with respect to said saw.

11. In apparatus for sharpening different types of circular saws, tools and other cutters having a wide range of diameters, the combination as set forth in claim 10, further characterized in that said means supporting said saw comprises means adjusting the elevation of said saw.

12. In apparatus for sharpening different types of circular saws, tools and other cutters having a wide range of diameters, the combination as set forth in claim 10, further characterized in that saw supporting means comprises manually adjustable means elevating said saw to said grinding wheel, and saw guide means supported on said stand independently of said saw supporting means.

13. In apparatus for sharpening different types of circular saws, tools and other cutters having a wide range of diameters, the combination as set forth in claim 10, further characterized in that said saw supporting means includes means supporting the saw in a horizontal position.

14. In apparatus for sharpening different types of circular saws, tools and other cutters having a wide range of diameters, the combination as set forth in claim 13, further characterized in that said saw supporting means includes means for tilting the saw horizontally.

15. In apparatus for sharpening different types of circular saws, tools and other cutters having a wide range of diameters, the combination as set forth in claim 12, further characterized in that said saw supporting means comprises a rail attached to said elevating means, a first member attached to said rail, a second member pivotally attached to said first member, a reel carrying said saw attached to said second member for supporting said saw in horizontal position and means for tilting said second member on said first member to angle of saw with respect to grinding wheel.

* * * * *